United States Patent
Raman et al.

(10) Patent No.: US 9,926,829 B2
(45) Date of Patent: Mar. 27, 2018

(54) LAMINAR FLOW OF PISTON COOLING JETS

(71) Applicant: General Electric Company, Schenectady, NY (US)

(72) Inventors: Vekatesh Raman, Bangalore (IN); James Hugo Martyn, Innsbruck (AT)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 14/918,013

(22) Filed: Oct. 20, 2015

(65) Prior Publication Data
US 2017/0107890 A1 Apr. 20, 2017

(51) Int. Cl.
| | |
|---|---|
| *F01P 3/08* | (2006.01) |
| *F01M 1/08* | (2006.01) |
| *F02F 3/22* | (2006.01) |
| *F16N 7/34* | (2006.01) |
| *F01P 3/00* | (2006.01) |

(52) U.S. Cl.
CPC .......... *F01P 3/08* (2013.01); *F01M 1/08* (2013.01); *F02F 3/22* (2013.01); *F16N 7/34* (2013.01); *F01M 2001/086* (2013.01); *F01P 2003/006* (2013.01)

(58) Field of Classification Search
CPC ...... F01P 3/08; F01M 1/08; F02F 3/22; F16N 7/34
See application file for complete search history.

(56) References Cited

FOREIGN PATENT DOCUMENTS

| | | | |
|---|---|---|---|
| DE | 19634742 A | * | 4/1998 |
| DE | 102007029993 A1 | | 1/2009 |
| DE | 102010007602 A1 | | 8/2011 |
| EP | 2096290 B1 | | 6/2014 |
| JP | 2001003724 A | | 1/2001 |
| JP | 2006138307 A | | 6/2006 |
| WO | 8904916 A1 | | 6/1989 |

OTHER PUBLICATIONS

International Search Report and Written Opinion issued in connection with corresponding Application No. PCT/US2016/057442 dated Feb. 2, 2017.

* cited by examiner

*Primary Examiner* — Kevin A Lathers
(74) *Attorney, Agent, or Firm* — Fletcher Yoder, P.C.

(57) ABSTRACT

A nozzle of a piston cooling system includes a flow path defined by a structure of the nozzle and configured to receive a cooling fluid, a first flow opening fluidly coupled with the flow path and extending through the structure of the nozzle, and a second flow opening fluidly coupled with the flow path and extending through the structure of the nozzle. The first flow opening and the second flow opening are sized to enable laminar flow of corresponding first and second jets of the cooling fluid discharged through the first and second flow openings, respectively.

20 Claims, 5 Drawing Sheets

LAMINAR FLOW OF PISTON COOLING JETS

BACKGROUND OF THE INVENTION

The subject matter disclosed herein relates to cooling of components of an engine. More specifically, the subject matter disclosed herein relates to flow of a piston cooling jet.

An engine system, such as a reciprocating engine system, may be used to provide power for a variety of applications, such as oil and gas processing systems, commercial and industrial building, and vehicles. The reciprocating engine system may include one or more cylinders, each cylinder having a piston disposed therein that is moved linearly (e.g., via energy provided by combustion in a combustion chamber or zone in the cylinder) during operation of the reciprocating engine system. The reciprocating engine system may include certain other components (e.g., connecting rods) configured to translate the linear motion of each piston to rotation of a crankshaft. The rotating crankshaft may be coupled to one or more loads, directly or indirectly, to provide the power to the load.

As the piston moves linearly within the cylinder due to combustion, the piston may absorb some heat from the combustion. In some embodiments and/or during certain operating conditions, the piston and corresponding cylinder may overheat, thereby causing efficiency of the engine to be reduced. Unfortunately, traditional reciprocating engine systems may inadequately regulate a temperature of the piston and/or associated components.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the present disclosure. Indeed, the present disclosure may encompass a variety of forms that may be similar to or different from the embodiments set forth below.

In a first embodiment, a nozzle of a piston cooling system includes a flow path defined by a structure of the nozzle and configured to receive a cooling fluid, a first flow opening fluidly coupled with the flow path and extending through the structure of the nozzle, and a second flow opening fluidly coupled with the flow path and extending through the structure of the nozzle. The first flow opening and the second flow opening are sized to enable laminar flow of corresponding first and second jets of the cooling fluid discharged through the first and second flow openings, respectively.

In a second embodiment, an engine system includes a cylinder, a piston disposed within the cylinder, and a nozzle configured to inject one or more jets of cooling fluid into the piston. The nozzle comprises laminar flow features configured to enable laminar flow of the one or more jets of cooling fluid.

In a third embodiment, a method for cooling a piston of an engine includes pressurizing a cooling fluid via a pump, flowing the cooling fluid through a cooling nozzle, and injecting, out of an end of the cooling nozzle, one or more laminar jets of cooling fluid into the piston of the engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
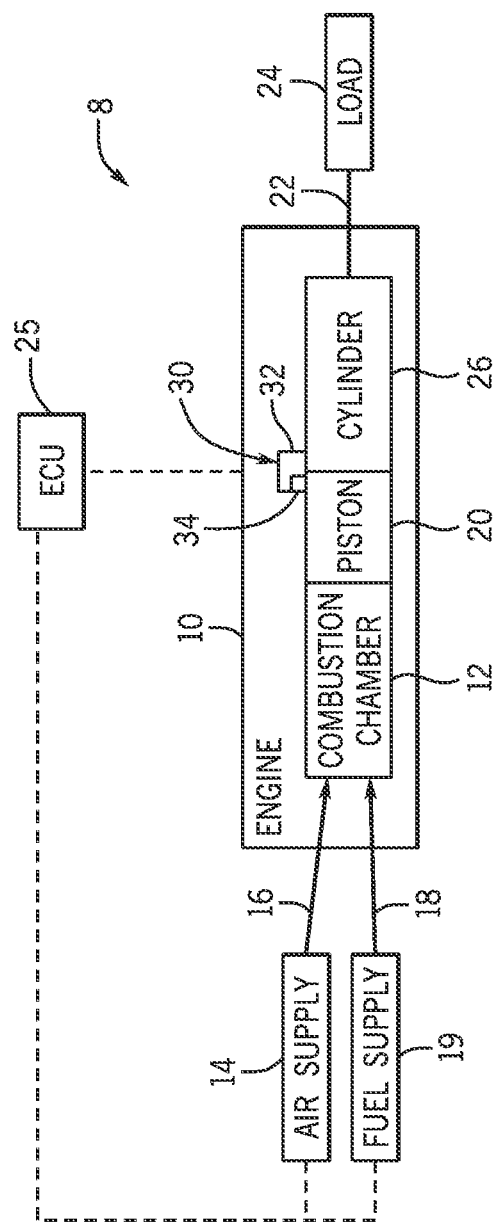
FIG. 1 is a schematic view of an embodiment of an engine driven power generation system having a cooling system (e.g., a piston cooling system), in accordance with an aspect of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to engine systems (e.g., reciprocating engine systems) and, more specifically, to a system and method for cooling a piston and other components of the reciprocating engine system. For example, the reciprocating engine includes a cylinder having a piston disposed within the cylinder (and, in some embodiments, multiple cylinders each having a corresponding piston disposed therein). The reciprocating engine may include an ignition feature (e.g., spark plug, glow plug, etc.) that ignites a fuel-oxidant (e.g., fuel-air) mixture within a combustion chamber proximate to the piston (e.g., within the cylinder and above the piston). However, it should be noted that the presently disclosed cooling features are also applicable diesel engines and dual fuel engines. In the exemplary reciprocating engine, the hot combustion gases generated from ignition of the fuel-air mixture drive the piston within the cylinder. In particular, the hot combustion gases expand and exert a pressure against the piston that linearly moves the position of the piston from a top portion (e.g., proximate to top dead center [TDC]) to a bottom portion (e.g., proximate to bottom dead center [BDC]) of the cylinder during an expansion stroke. The piston converts the pressure exerted by the hot combustion gases (and the piston's linear motion) into a rotating motion (e.g., via a connecting rod coupled to, and extending between, the piston and a crankshaft) that drives one or more loads, e.g., an electrical generator.

The reciprocating engine also includes a cooling system having a nozzle configured to provide a cooling fluid (e.g., cooling oil) to the piston and, in some embodiments, to other components of the reciprocating engine. For example, the nozzle may include a flow path fluidly coupled with a cooling fluid source of the cooling system and a pump of the cooling system. The pump may urge (e.g., push or pull) the cooling fluid through the flow path of the nozzle toward openings (e.g., exit ports) of the nozzle. Jets of the cooling fluid are urged through the openings of the nozzle and travel toward the piston. In accordance with the present disclosure, the cooling system enables laminar flow (e.g., substantially laminar flow) of the jets of cooling fluid traveling between the openings of the nozzle and the piston. Laminar flow reduces a divergence of the cooling fluid compared to turbulent flow. In general, laminar flow is achieved by facilitating a flow having a Reynold's number equal to or less than approximately 2040. Reynold's number is a dimensionless quantity defined by:

$$\text{Re}_\# = \frac{\text{inertial forces}}{\text{viscous forces}} = \frac{\rho V L}{\mu} = \frac{V L}{v}, \quad (1)$$

where ρ=density, V=velocity, L=distance, μ=dynamic viscosity, and v=kinematic viscosity. Thus, laminar flow is generally facilitated by reducing inertial forces and increasing viscous forces, such that a relatively low Reynold's number (e.g., equal to or less than approximately 2040) is achieved.

However, it should be noted that, in accordance with present embodiments, enabling a velocity of the jets of cooling fluid that exceeds a minimum velocity threshold may also be beneficial. For example, achieving at least the minimum velocity threshold may enable the jets to reach, for example, a particular target (e.g., an opening) of the piston while the piston is located at the BDC position, at the TDC position, or while the piston is moving between the BDC position and the TDC position. Accordingly, the pump may provide a pressure of the fluid to the nozzle such that the jets of cooling fluid are ejected from the nozzle at a velocity exceeding the minimum velocity threshold, where the minimum velocity threshold may be equal to, for example, a mean piston speed (MPS) of the piston. For example, the MPS may be within a range of 8 to 15 meters per second (26.2 to 49.2 feet per second), 9 to 13 meters per second (29.5 to 42.6 feet per second), or 10 to 12 meters per second (32.8 to 39.4 feet per second), and the jets of cooling fluid are ejected from the nozzle such that they travel at a velocity greater than the MPS of the piston. In some embodiments, it may be beneficial to provide a velocity of the jets just greater than the MPS, in order to provide the lowest possible Reynold's number (e.g., to achieve laminar flow).

In accordance with present embodiments, the nozzle (and/or other components of the cooling system or engine system) includes laminar flow features that enable laminar flow of the cooling fluid as the cooling fluid exits the nozzle and travels toward the piston. Specifically, the cooling system and/or engine system may include passive features that enable laminar flow and active features that enable laminar flow. For example, passive laminar flow features of the nozzle may include multiple openings through which the cooling fluid exits the flow path of the nozzle toward the piston. In other words, the multiple openings direct multiple corresponding jets of the cooling fluid toward the piston and are sized, shaped, and/or positioned to enable laminar flow, as described below. In some embodiments, the nozzle of the cooling system may also include one or more openings that directs corresponding one or more jets of cooling fluid toward a small end bearing (e.g., end bearing) of the engine, where the small end bearing is disposed between the piston and the connecting rod of the engine, as described below with reference to the figures. In general, the cooling fluid lubricates the small end bearing, but may also provide a cooling effect to the small end bearing.

Each of the nozzle openings may be sized, positioned, and/or shaped to accommodate laminar flow of the multiple jets of cooling fluid between the nozzle and the piston. For example, a diameter of each nozzle opening may be determined (e.g., relative to a width of the flow path coupled to the nozzle openings) to enable laminar flow. Additionally or alternatively, a cross-sectional shape of each nozzle may be determined to enable laminar flow.

Further, in some embodiments, the cooling system and/or engine system may include active features configured to enable laminar flow. For example, the pump may be adjusted or set to provide a particular pressure and/or velocity of the cooling fluid traveling through the flow path of the nozzle to facilitate the laminar flow of the cooling fluid exiting the nozzle. By enabling laminar flow of the cooling fluid (e.g., as opposed to turbulent flow), divergence of the cooling fluid is reduced or negated. Accordingly, the cooling fluid is more accurately directed to the piston (e.g., toward openings in the piston), thereby enhancing an oil capture rate (e.g., an amount of oil received by the opening of piston and/or that enters a cooling cavity of the piston) of the cooling system, enhancing cooling of the piston, and enhancing efficiency of the reciprocating engine, as described in detail with reference to the figures below. For example, by enabling the laminar flow, divergence of the jets of cooling fluid is reduced, thereby increasing the oil capture rate of the piston. Increasing the oil capture rate of the piston enhances cooling of the piston and increases efficiency of the cooling system, thereby saving cooling fluid. Further, enhancing cooling of the piston reduces a susceptibility of thermal cracking of the piston. Further still, increasing the oil capture rate by reducing divergence of the jets of cooling fluid enhances an accuracy and/or precision of cooling of the piston, thereby increasing thermal control capabilities of the cooling system.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, 24 or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. The presently disclosed embodiments also include mechanical drive applications (e.g., compressors and/or pumps). Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example. As previously described, presently disclosed embodiments also include diesel and dual-fuel engines.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 12, 14, 16, 18, 20, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra), General Electric Company's transportation engines (e.g., GEVO V12 and 16 inline 6 or 8), and/or Waukesha Engines (e.g., Waukesha VGF, VHP, APG, 275GL), for example.

The driven power generation system 8 may include an engine control unit (ECU) 25 (e.g., controller) communicatively coupled to, for example, the engine 10 (and components thereof), the air supply 14, and the fuel supply 19. During operations, signals from various sensors are communicated to the ECU 25 to such that the ECU 25 can detect and/or correct undesired engine conditions. The ECU 25 may also be communicatively coupled to certain other components of the engine 10 (e.g., cooling components) described in detail below, and may be configured to detect and/or correct undesired engine conditions of the certain other components of the engine 10 (e.g., cooling components).

In accordance with present embodiments, the driven power generation system 8 (or the engine 10 thereof) may include a cooling system 30 configured to cool components of the engine 10 (e.g., the piston 20 of the engine 10). The cooling system 30 may include a cooling fluid source 32 (e.g., having a storage tank or sump) and a nozzle 34, where the cooling fluid source 32 provides a cooling fluid (e.g., cooling oil) to the nozzle 34. The cooling fluid source 32, for example, may include a storage tank or sump that houses the cooling fluid and a pump that pushes or pulls the cooling fluid from the tank or sump toward and into the nozzle 34. The nozzle 34 includes a flow path fluidly coupled to the tank or sump of the cooling fluid source 32, where the flow path receives the cooling fluid. The nozzle 34 is generally configured to provide cooling fluid jets to the piston 20 to cool the piston 20. In some embodiments, the nozzle 34 may also be configured to provide cooling fluid jets to a small end bearing between the piston 20 and a connecting rod of the engine 10, as described in detail below with reference to FIG. 2, which lubricates the small end bearing and, in some embodiments, cools the small end bearing.

More specifically, in accordance with present embodiments, the cooling system 30 (e.g., the nozzle 34 thereof) includes laminar flow features configured to enable laminar flow (e.g., as opposed to turbulent flow) of the jets of cooling fluid provided by the nozzle 34 to the piston 20. For example, the pump of the cooling fluid source 32 may be controlled via the ECU 25 to provide a pressure and/or velocity of the cooling fluid that, in conjunction with characteristics of the nozzle 34, enables laminar flow of the jets of cooling fluid. Additionally or alternatively, the nozzle 34 may include multiple openings (e.g., as opposed to a single opening, which may cause turbulent flow of the jet(s) of cooling fluid), each opening being sized and/or shaped to, in conjunction with one another, accommodate laminar flow of the jets of cooling fluid and a velocity exceeding at least a minimum velocity threshold of the jets of cooling fluid (e.g., to ensure that the cooling fluid reaches the piston during operation of the engine). By enabling laminar flow of the jets of cooling fluid, divergence of the jets of cooling fluid is reduced or negated, thereby enhancing an oil capture rate of the cooling system 30 and, thus, an efficiency of the cooling system 30 and engine 10 in general. By enabling a velocity of the jets of cooling fluid that exceeds the minimum velocity threshold (e.g., where the minimum velocity threshold corresponds with a mean piston speed [MPS] of the piston), the cooling fluid is not "outrun" by the piston and, thus, the cooling fluid reaches the piston. Further, as noted above, the cooling system 30 may be communicatively coupled with the ECU 25 such that the ECU 25 may detect undesired operating conditions of the cooling system 30 and/or correct the undesired operating conditions of the cooling system 30.

Figure 2:
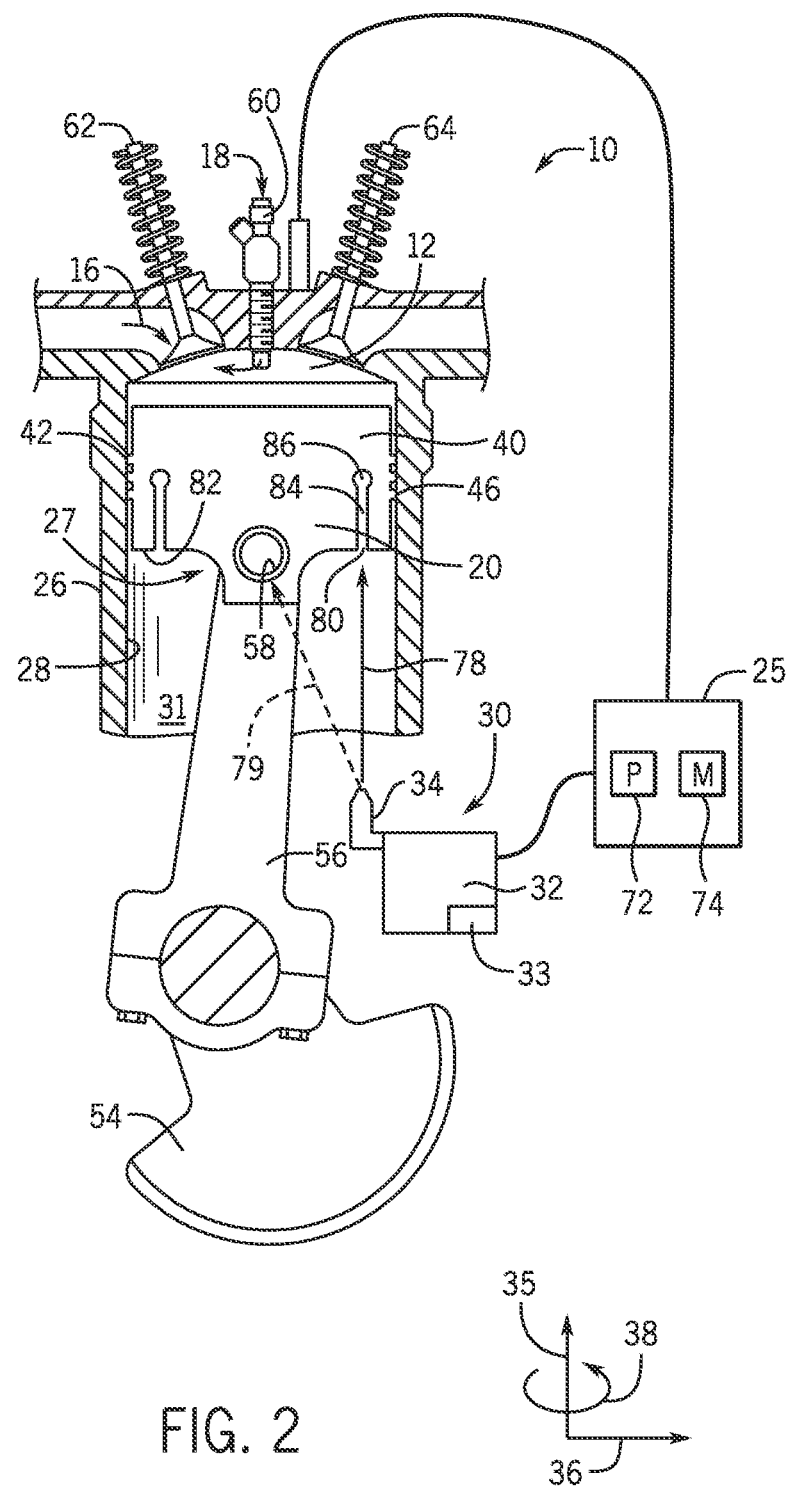
FIG. 2 is a schematic cross-sectional view of an embodiment of an engine and cooling system for use in the engine driven power generation system of FIG. 1, in accordance with an aspect of the present disclosure.

FIG. 2 is a side cross-sectional view of an embodiment of a piston assembly 27 having the piston 20 disposed within the cylinder 26 (e.g., an engine cylinder) of the reciprocating engine 10. The cylinder 26 has an inner annular wall 28 defining a cylindrical cavity 31 (e.g., bore). The piston 20 may be defined by (or described with reference to) an axial axis or direction 35, a radial axis or direction 36, and a circumferential axis or direction 38. The piston 20 includes a top portion 40 (e.g., a top land). The top portion 40 generally blocks the fuel 18 and the air 16, or a fuel-air mixture, from escaping from the combustion chamber 12 during reciprocating motion of the piston 20.

As shown, the piston 20 is attached to a crankshaft 54 via a connecting rod 56 and a small end bearing 58 (e.g., a pin).

The crankshaft 54 translates the reciprocating linear motion of the piston 20 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 causes the piston 20 to move in a reciprocating manner (e.g., back and forth) in the axial direction 34 within the cavity 31 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process typically occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC.

During operation of the engine 10, the piston 20 may become hot due to combustion in the combustion chamber, friction between the piston 20 and the annular wall 28 of the cylinder 26, and other factors. As the piston 20 generates and/or absorbs more heat, the piston 20 may thermally expand toward the annular wall 28 of the cylinder 26, which may reduce an efficiency of the engine 10 if the piston 20 overheats beyond an allowable amount. Accordingly, the cooling system 30 is included to cool the piston 20 (and, in some embodiments, to lubricate the small end bearing 58 between the piston 20 and the connecting rod 56).

For example, the cooling system 30 includes the cooling fluid source 32 (e.g., having a tank or sump that stores or holds the cooling fluid and a pump 33 that moves or pressurizes the cooling fluid). The pump 33 of the cooling fluid source 32 urges (e.g., pushes or pulls) the cooling fluid from the tank or sump of the cooling fluid source 32 to the nozzle 34. As previously described, the nozzle 34 may include a flow path which receives the cooling fluid and multiple (e.g., two or more) openings through which the cooling fluid exits the nozzle 34. The pressure provided by the pump 33 causes jets 78 of cooling fluid to exit the nozzle 34 through the multiple openings and travel toward the piston 20. In particular, the jets 78 are directed by the nozzle 34 toward one or more openings 80 in the piston 20, where the openings 80 are disposed, for example, through a bottom 82 of the piston 20. The one or more openings 80 may be fluidly coupled to one or more corresponding flow paths 84 (e.g., linear cylindrical flow paths) extending, for example, in direction 35. The one or more flow paths 84 may be fluidly coupled to an annular cavity 86 extending in the annular direction 38 about the top land 40 (or some other area) of the piston 20. In some embodiments, the piston 20 may include one opening 80 and corresponding flow path 84 configured to receive the jet(s) 78 of cooling fluid and another opening 80 and corresponding flow path 84 configured to enable the cooling fluid to exit the piston 20, where the two openings 80 and corresponding flow paths 84 are fluidly coupled by the annular cavity 86. It should also be noted that, in some embodiments, the nozzle 34 may include one opening that is sized, positioned, and/or shaped to direct a portion of the cooling fluid toward the small end bearing 58 of the engine 10 (e.g., as indicated by dashed line 79). These and other features will be described in detail below with reference to later figures.

Figure 3:
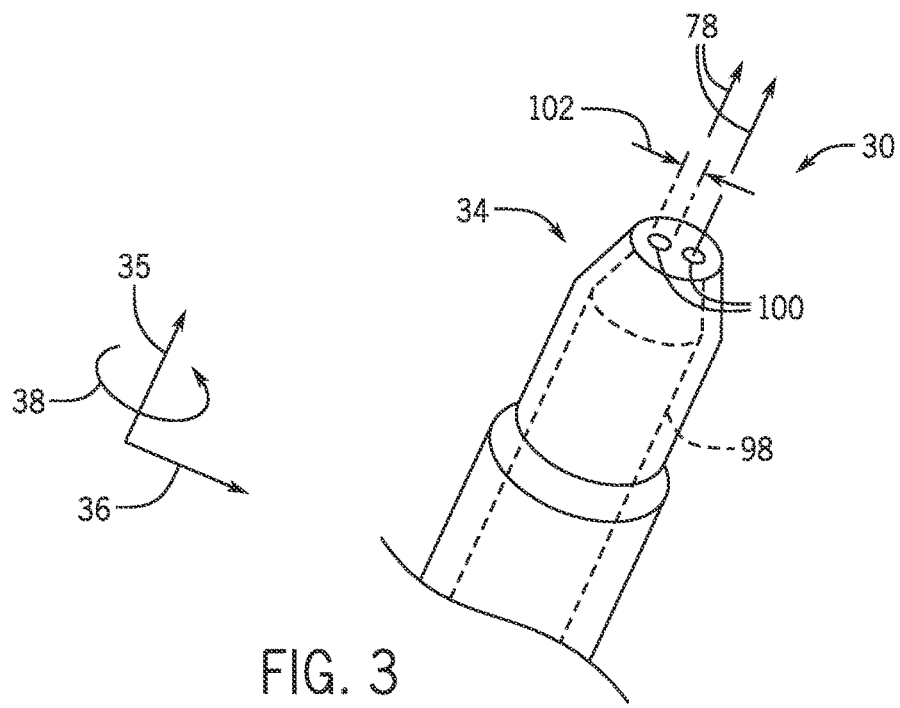
FIG. 3 is a perspective view of an embodiment of a nozzle for use in the cooling system of FIG. 2 (e.g., having two openings), in accordance with an aspect of the present disclosure.
Figure 4:
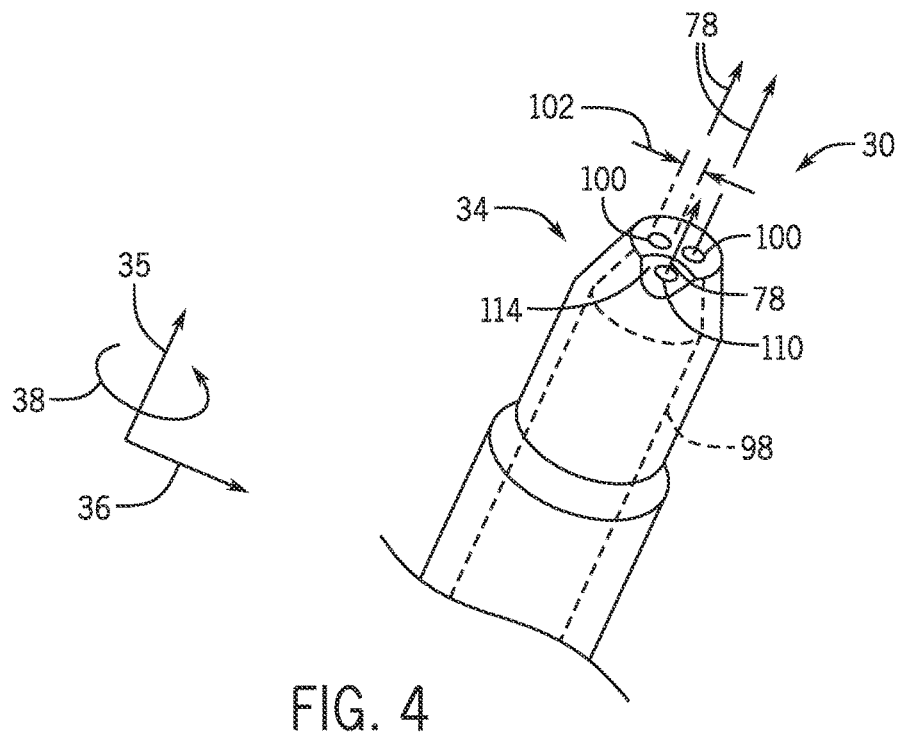
FIG. 4 is a perspective view of an embodiment of a nozzle for use in the cooling system of FIG. 2 (e.g., having three openings), in accordance with an aspect of the present disclosure.

Perspective views of embodiments of the nozzle 34, in accordance with the present disclosure, are shown in FIGS. 3 and 4. In FIG. 3, the nozzle 34 includes a flow path 98 and two openings 100 fluidly coupled to the flow path 98. In the illustrated embodiment, each of the two openings 100 is circular in cross-sectional shape, where the cross-sectional shape includes a diameter 102. However, other embodiments may include a different cross-sectional shape for the openings 100. In the illustrated embodiment, the diameters 102 of the two openings 100 may be the same or may be different. In general, the two openings 100 and corresponding diameters 102 may be sized and/or shaped to accommodate laminar flow of the jets 78 of cooling fluid exiting the two openings 100, in addition to providing a high enough velocity of the jets 78 of cooling fluid to ensure that the cooling fluid reaches the intended target (e.g., the piston of the engine). For example, one or more of the diameters 102 of the two openings 100 may be sized between 2 millimeters (0.079 inches) and 3 millimeters (0.118 inches), 2.2 millimeters (0.087 inches) and 2.8 millimeters (0.110 inches), or 2.4 millimeters (0.094 inches) and 2.6 millimeters (0.102 inches). In another embodiment (e.g., of larger engines), the diameters 102 of the two openings 100 may be sized between 2 millimeters (0.078 inches) and 5 millimeters (0.197 inches), 3.2 millimeters (0.126 inches) and 4.8 millimeters (0.189 inches), or 3.6 millimeters (0.181 inches) and 4.2 millimeters (0.165 inches).

It should be noted that a diameter of the bore of the cylinder (e.g., cylinder 26 in FIG. 2) may be between 100 millimeters (3.94 inches) and 250 millimeters (9.84 inches), 130 millimeters (5.12 inches) and 220 millimeters (8.66 inches), or 140 millimeters (5.51 inches) to 150 millimeters (5.91 inches). In general, a ratio of the diameter 102 of each opening 100 to the diameter of the bore of the cylinder (e.g., cylinder 26 in FIG. 2) may be between 0.01 and 0.03, 0.015 and 0.025, or 0.18 and 0.23. Further still, it should be noted that a diameter of the flow path 98 of the nozzle 34 may be between 6 millimeters (0.236 inches) and 14 millimeters (0.551 inches), 7 millimeters (0.276 inches) and 13 millimeters (0.512 inches), or 8 millimeters (0.315 inches) and 12 millimeters (0.472 inches). Accordingly, a ratio of the diameter of the flow path 98 of the nozzle 34 to the diameter 102 of each opening 100 may be between 0.3 and 0.4, 0.32 and 0.38, or 0.325 and 0.36. Embodiments in accordance with the present disclosure may include larger or smaller engines than the examples provided.

It should also be noted that, as described above, the two openings 100 may include cross-sectional areas shaped differently than a circle. For example, the two openings 100 may include oval-like cross-sectional shapes, elliptical cross-sectional shapes, triangular cross-sectional shapes, square cross-sectional shapes, or some other cross-sectional shape. Accordingly, the diameters 102 of the openings 100 described above may also encompass embodiments of the openings 100 having cross-sectional shapes different than a circle, and the diameters 102 (and corresponding dimensions) described above may relate to a "maximum width" of the differently shaped cross-section(s). In general, the two openings 100 may include, regardless of the cross-sectional shape, cross-sectional areas that enable laminar flow. For example, the cooling fluid may be urged toward the two openings 100 in the nozzle 34 via a particular pressure provided by the pump of the cooling system. The two openings 100 may include a particular cross-sectional area (or particular diameter 102) to enable a certain flux (e.g., amount of cooling fluid per unit time) of cooling fluid through the two openings 100, to enable a certain velocity of cooling fluid through the two openings 100, or to enable a combination thereof that enables laminar flow.

Further, flow parameters of the jets 78 of cooling fluid through the flow path 98 may be determined to provide laminar flow to the jets 78 of cooling fluid exiting the two openings 100. As previously described, components of the cooling system 30 (e.g., the pump of the cooling fluid source 32 shown in FIGS. 1 and 2) may enable the flow parameters determined to provide the laminar flow to the jets 78 of cooling fluid. For example, the pump may enable a particular flow rate, jet velocity, or oil pressure to facilitate the laminar flow. As previously described, the ECU 25 shown in FIGS. 1 and 2 may be communicatively coupled to the cooling system 30 and may instruct the cooling system 30 to provide any one or more of the flow parameters described above (e.g., based on data feedback from a sensor communicatively coupled with the ECU 25 and fluidly coupled with the cooling system 30, where the sensor measures or detects parameters of the flow of cooling fluid indicative of Reynold's number, velocity, etc.).

Figure 5:
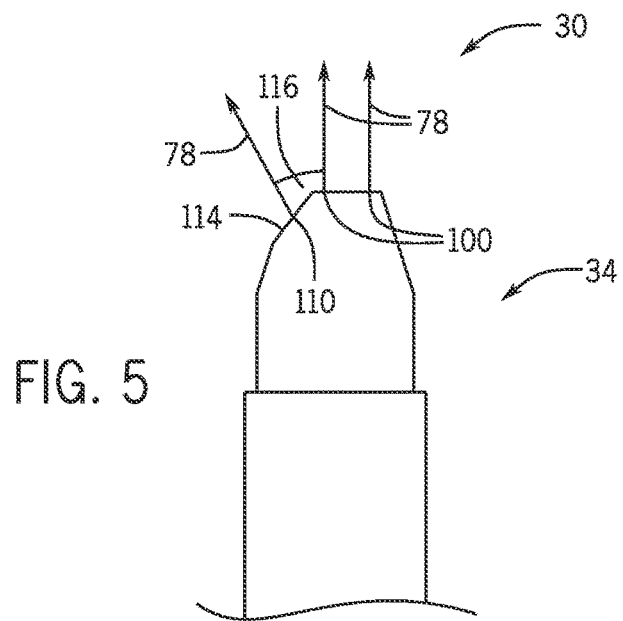
FIG. 5 is a side view of an embodiment of a nozzle for use in the cooling system of FIG. 2, in accordance with an aspect of the present disclosure.

In FIG. 4 the nozzle 34 includes the two openings 100 described in FIG. 3, in addition to a third opening 110 that provides a jet 78 of cooling fluid in a direction different than those of the jets 78 provided by the two openings 100. For example, the jets 78 of fluid provided by the two openings 100 are directed in direction 35, and the jet 78 of fluid provided by the third opening 110 is directed at an angle to direction 35. The third opening 110 may be sized, positioned, and/or shaped to direct the jet 78 of cooling fluid toward a particular component of the engine. For example, as previously described, the third opening 110 may direct the jet 78 of cooling fluid toward the small end bearing between the piston and the connecting rod, thereby causing the cooling fluid to lubricate the small end bearing. As shown in FIGS. 4 and 5, the third opening 110 may be disposed on a sloped surface 114 (e.g., relative to a longitudinal axis of the nozzle 34) of the nozzle 34 such that the jet 78 of cooling fluid provided by the third opening 110 is directed at an angle 116 to the direction of the jets 78 of cooling fluid provided by the two openings 100. In other embodiments, the third opening 110 may be disposed on the same surface as the two openings 100, but may be angled or tapered to direct the corresponding jet 78 at the angle 116.

It should be noted that, in embodiments having the third opening 110, the diameters 102 of the two openings 100 and of the third opening 110 may be similar to those described with reference to FIG. 3. However, in some embodiments, the two openings 100 and the third opening 110 may include smaller diameters than those described with reference to FIG. 3. Further, the two openings 100 and the third opening 110 may have equal diameters 102, or the two openings 100 and the third opening 110 may include different diameters 102. Further, the openings 100, 110 may not include a circular cross-sectional shape, but may rather include a different cross-sectional shape having equal or varying maximum widths. In general, the diameters 102 (or widths) of the two openings 100 and the third opening 110 may be dependent on the flow parameters (e.g., flow rate, jet velocity, or oil pressure) to achieve laminar flow. As previously described, the nozzle 34 and flow parameters are generally designed to reduce inertial forces and increase viscous forces of the jets 78 of cooling fluid, thereby reducing the Reynold's number to, or below, a relatively low 2040. However, the nozzle 34 and flow parameters are also generally designed to enable a velocity of the jets 78 that exceeds a minimum velocity threshold (e.g., a mean piston speed [MPS] of the piston), such that the jets 78 reach the piston during operation of the engine. For example, the MPS may be within a range of 8 to 15 meters per second (26.2 to 49.2 feet per second), 9 to 13 meters per second (29.5 to 42.6 feet per second), or 10 to 12 meters per second (32.8 to 39.4 feet per second), and the jets of cooling fluid are ejected from the nozzle such that they travel at a velocity greater than the MPS of the piston.

Figure 6:
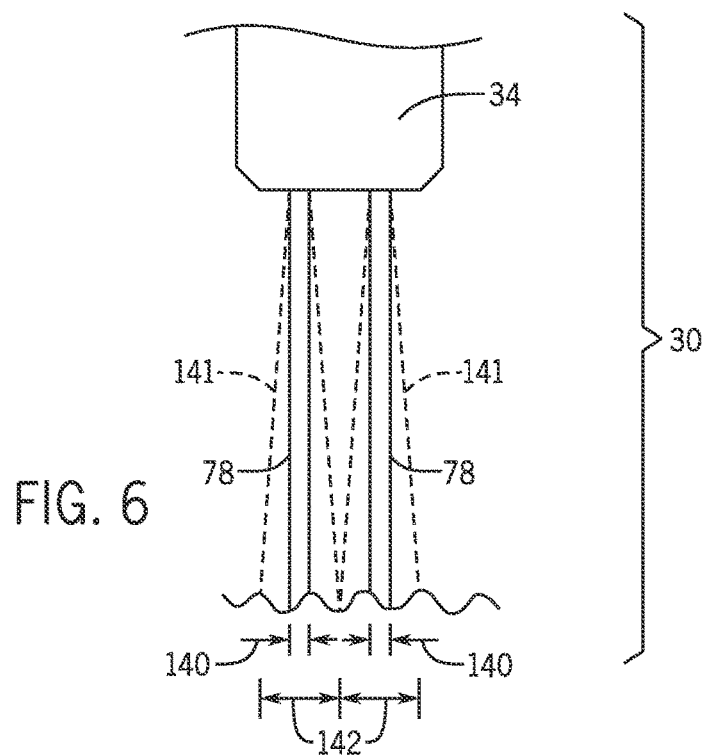
FIG. 6 is a side view of an embodiment of a nozzle and corresponding jets of cooling fluid having laminar flow for use in the cooling system of FIG. 2, in accordance with an aspect of the present disclosure.

Turning now to FIG. 6, a front schematic view of an embodiment of the nozzle 34 and corresponding jets 78 of cooling fluid is shown. The nozzle 34 generates two jets 78 of cooling fluid that each include laminar flow. In other words, a Reynold's number of each of the jets 78 of cooling fluid in the embodiment in FIG. 6 is at or below approximately 2040. As shown, the jets 78 having laminar flow each include a maximum laminar jet width 140. For comparison, while not part of the illustrated embodiment, turbulent flow of turbulent jets 141 is also shown in the illustrated embodiment via dashed lines. A Reynold's number of each turbulent jet 141 is above approximately 2040. As shown, the turbulent jets 141 each include a maximum turbulent jet width 142. The maximum turbulent jet width 142 of the turbulent jet 141 is greater than the maximum laminar jet width 140 of the jet 78 of cooling fluid having laminar flow, because the turbulent jet 141 is more susceptible to divergence than the jets 78 having laminar flow. As previously described, the divergence of the turbulent jet 141 causes a reduced oil capture rate of the engine component (e.g., the piston), as compared to the jet 78 having laminar flow with less divergence. The reduced oil capture rate reduces a cooling efficiency of the system, because it requires using a greater amount of cooling fluid to achieve the same flux of fluid entering, for example, the opening in the piston. Additionally or alternatively, divergence of cooling fluid may reduce a predictability of oil capture rate, thereby reducing thermal control (e.g., accuracy and/or precision of the thermal control) of the piston and other components of the engine (e.g., the small end bearing).

Figure 7:
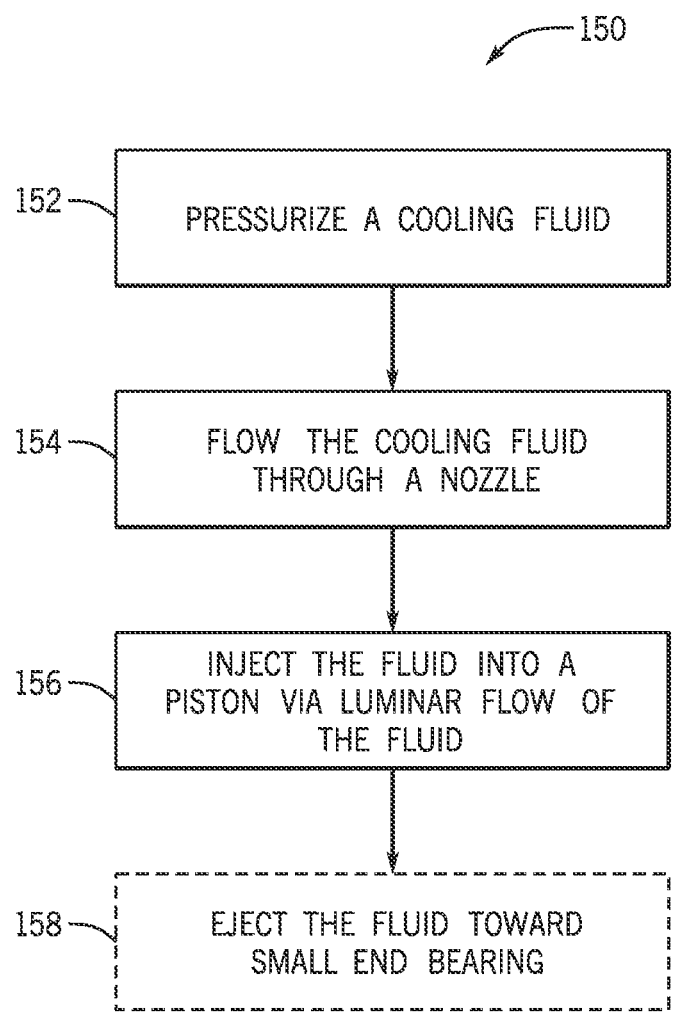
FIG. 7 is an embodiment of a method of cooling a piston of an engine, in accordance with an aspect of the present disclosure.

A method 150 of cooling a piston of an engine system (e.g., a reciprocating engine system) is shown in FIG. 7. In the illustrated embodiment, the method 150 includes pressurizing a cooling fluid (block 152). For example, the cooling system may include a storage tank or sump, a pump fluidly coupled with the storage tank or sump, and the nozzle fluidly coupled with the storage tank or sump. The cooling fluid may be stored in the storage tank or sump and pressurized in order to force (e.g., urge, pressure, push, pull) the fluid toward the nozzle via the pump.

The method 150 also includes flowing the cooling fluid through a nozzle (block 154). For example, the nozzle may include one or more openings fluidly coupled with a flow path of the nozzle through which the cooling fluid flows. The cooling fluid may be pressurized via the pump and flowed through the flow path toward the one or more openings.

The method 150 also includes injecting the fluid into a piston by ejecting the fluid from the nozzle and toward an opening in the piston (block 156). For example, the openings in the nozzle may extend through a structure of the nozzle that defines the flow path of the nozzle. Accordingly, the openings may enable the cooling fluid to exit the flow path and may direct jets of the cooling fluid toward the piston. In other words, the openings may face the piston and enable the cooling fluid to exit the nozzle and travel toward the piston. The opening(s) may be sized, positioned, and/or shaped to facilitate aiming the jet(s) of cooling fluid toward a particular target (e.g., an opening in the piston fluidly coupled with an interior cooling cavity of the piston). In some embodiments, the nozzle may include multiple openings. The multiple openings may all point toward the same target, or certain (e.g., one or more) of the multiple openings may point toward a first target and certain (e.g., one or more) other of the multiple openings may point toward a second target. For example, the method 150 may optionally include directing the cooling fluid toward a target other than the opening in the piston, such as a small end bearing (block 158). In other words, two openings may direct the cooling fluid toward an opening in the piston, while a third opening directs the cooling fluid toward a small end bearing. The cooling fluid may contact the small end bearing to lubricate the small end bearing.

In general, embodiments of the present disclosure are directed to features that enable laminar flow of jets of cooling fluid provided to, for example, a piston of a reciprocating engine. For example, a nozzle of a cooling system that provides the jets of cooling fluid may include multiple (e.g., two, three, four, or more) openings that are sized and/or shaped to direct jets of cooling fluid having laminar flow toward the piston. Other features of the cooling system and/or the reciprocating engine may work in conjunction with the nozzle to enable laminar flow of the cooling jets, as described above. In general, the engine system (or cooling system thereof) may includes passive laminar flow features (e.g., the size, shape, and/or position of the openings of the nozzle), active laminar flow features (e.g., a controller that controls a pressure or velocity of the cooling fluid), or a combination thereof. By utilizing the passive features, the active features, or the combination thereof to enable the laminar flow, divergence of the jets of cooling fluid is reduced, thereby increasing an oil capture rate of the piston. Increasing the oil capture rate of the piston enhances cooling of the piston and increases an efficiency of the cooling system, thereby saving cooling fluid. Further, enhancing cooling of the piston reduces a susceptibility of thermal cracking of the piston. Further still, increasing the oil capture rate by reducing divergence of the jets of cooling fluid enhances an accuracy and/or precision of cooling of the piston, thereby increasing thermal control capabilities of the cooling system.

This written description uses examples to disclose the present disclosure, including the best mode, and also to enable any person skilled in the art to practice the disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A nozzle of a piston cooling system, comprising:
 a flow path defined by a structure of the nozzle and configured to receive a cooling fluid;
 a first flow opening fluidly coupled with the flow path and extending through the structure of the nozzle;
 a second flow opening fluidly coupled with the flow path and extending through the structure of the nozzle; and
 a third flow opening fluidly coupled with the flow path and extending through the structure of the nozzle, wherein the first flow opening and the second flow opening are sized to enable laminar flow of corresponding first and second jets of the cooling fluid discharged through the first and second flow openings, respectively, wherein the first and second flow openings are configured to direct the first and second jets of the cooling fluid, respectively, in a first direction, wherein the third flow opening is configured to direct the third jet of the cooling fluid in a second direction, and wherein the second direction is different than the first direction.

2. The nozzle of claim 1, wherein the first flow opening comprises a first cross-sectional area, wherein the second flow opening comprises a second cross-sectional area, and wherein the first and second cross-sectional areas are equal to one another.

3. The nozzle of claim 1, wherein the first flow opening comprises a first cross-sectional shape having a first maximum width, wherein the second flow opening comprises a second cross-sectional shape having a second maximum width, and wherein the first maximum width and the second maximum width are equal.

4. The nozzle of claim 3, wherein the first maximum width and the second maximum width are each between 2 and 5 millimeters.

5. The nozzle of claim 3, wherein the first flow opening comprises a first cross-sectional shape having a first maximum width, wherein the second flow opening comprises a second cross-sectional shape having a second maximum width, wherein the third flow opening comprises a third cross-sectional shape having a third maximum width.

6. The nozzle of claim 5, wherein the first maximum width, the second maximum width, and the third maximum width are equal.

7. The nozzle of claim 5, wherein the third maximum width is not equal in length to the first and second maximum widths.

8. The nozzle of claim 1, wherein the third flow opening is sized to enable laminar flow of a corresponding third jet of the cooling fluid discharged through the third flow opening.

9. A system, comprising:
 a piston cooling system configured to cool a piston that moves in a cylinder, wherein the piston cooling system comprises:
 a nozzle comprising one or more openings configured to inject one or more jets of cooling fluid into the piston;
 a sensor configured to measure one or more parameters of the cooling fluid; and a controller configured to control injection of the cooling fluid through the nozzle to provide laminar flow of the one or more jets of the cooling fluid based at least in part on the one or more parameters measured by the sensor.

10. The system of claim 9, comprising the piston disposed in the cylinder.

11. The system of claim 10, comprising an engine having the piston, the cylinder, and the piston cooling system.

12. The system of claim 9, wherein the piston has a plurality of axial openings extending axially into the piston at different positions about a circumference of the piston, and the nozzle is configured to direct the cooling fluid into at least one axial opening of the plurality of axial openings.

13. The system of claim 9, wherein the laminar flow of the one or more jets of cooling fluid into the piston has a Reynold's number of 2040 or less.

14. The system of claim 9, wherein the one or more openings comprise first and second openings configured to inject first and second jets of the cooling fluid into the piston in respective first and second directions, the first direction is an axial direction along an axis of the piston and the cylinder, and the second direction is angled relative to the axis of the piston and the cylinder.

15. The system of claim 9, wherein the one or more openings of the nozzle comprise first, second, and third openings configured to inject first, second, and third jets of the cooling fluid toward the piston, wherein the third opening is configured to direct a portion of the cooling fluid in a second direction different than a first direction of the cooling fluid directed by the first and second openings.

16. The system of claim 9, wherein the one or more openings of the nozzle comprise first and second openings, and the second opening is disposed on a surface that is angled relative to a longitudinal axis of the nozzle.

17. The system of claim 9, wherein the nozzle is configured to direct at least part of the cooling fluid toward a bearing between the piston and a connecting rod.

18. The system of claim 9, wherein the nozzle is configured to inject the one or more jets of cooling fluid into the piston such that each of the one or more jets of cooling fluid comprises a velocity equal to or greater than a mean piston speed of the piston while the piston is moving within the cylinder.

19. A method, comprising:
supplying a cooling fluid to a nozzle of a piston cooling system;
flowing the cooling fluid through one or more openings of the nozzle to direct one or more jets of the cooling fluid toward a piston disposed in a cylinder;
measuring one or more parameters of the cooling fluid with a sensor; and
controlling injection of the cooling fluid through the nozzle to provide laminar flow of the one or more jets of the cooling fluid based at least in part on the one or more parameters measured by the sensor.

20. The method of claim 19, wherein the one or more parameters comprise a flow rate of the cooling fluid, a velocity of the one or more jets of the cooling fluid, a pressure of the cooling fluid, or any combination thereof.

* * * * *